Nov. 28, 1961 W. J. SHANAHAN ET AL 3,011,015

TELEVISION

Filed Jan. 4, 1955 5 Sheets-Sheet 1

INVENTORS
WILLIAM J. SHANAHAN
RICHARD F. VETTER
EDWARD I. SACKS

BY Cushman, Darby & Cushman
ATTORNEYS

Nov. 28, 1961 W. J. SHANAHAN ET AL 3,011,015

TELEVISION

Filed Jan. 4, 1955 5 Sheets-Sheet 2

INVENTORS
WILLIAM J. SHANAHAN
RICHARD F. VETTER
EDWARD I. SACKS

BY *Cushman, Darby & Cushman*
ATTORNEYS

TELEVISION

INVENTORS
WILLIAM J. SHANAHAN
RICHARD F. VETTER
EDWARD I. SACKS
BY
Cushman, Darby & Cushman
ATTORNEYS INVENTORS
WILLIAM J. SHANAHAN
RICHARD F. VETTER
EDWARD I. SACKS
BY Cushman, Darby & Cushman
ATTORNEYS

INVENTORS

WILLIAM J. SHANAHAN

RICHARD F. VETTER

EDWARD I. SACKS

BY Cushman, Darby & Cushman

ATTORNEYS

United States Patent Office 3,011,015
Patented Nov. 28, 1961

3,011,015
TELEVISION

William J. Shanahan, Long Island City, Richard F. Vetter, St. Albans, and Edward I. Sacks, Bayside, N.Y., assignors to Skiatron Electronics & Television Corporation, New York, N.Y., a corporation of New York
Filed Jan. 4, 1955, Ser. No. 479,811
2 Claims. (Cl. 178—5.1)

This application pertains to scrambled television transmission systems and in particular to such systems wherein so-called record cards or business cards are employed at a receiver for decoding or unscrambling a televised image. The invention most particularly pertains to methods, and structure of decoding equipment and the record cards, for preventing illicit use of the system.

The invention of the present application is particularly related to the copending application of William J. Shanahan, Serial No. 316,485, filed October 23, 1952, and the copending application of William J. Shanahan et al., Serial No. 418,642, filed March 25, 1954, and is generally related to further patent documents referenced therein, all assigned to the assignee of the present invention.

In the just mentioned applications complete circuitry is shown wherein at the receiving end of a television transmission system as represented by given receiving apparatus, a record or business card having a printed circuit thereon which is not visible and cannot reasonably be determined by destruction of the card is employed, upon insertion into the so-called decoding unit, to complete circuits so as to be a factor in the unscrambling of the televised image. It is the primary object of the present invention to provide structure of printed circuit cards, and methods of use thereof, for preventing illicit or unauthorized use of cards as might conceivably be done by a person to enjoy viewing a given program or programs, but without payment therefor.

It will be appreciated that the use of business or record cards in scrambled television, as explained in the above mentioned copending applications by way of example, offers an excellent means of collecting payment for viewing of scrambled television programs. The cards may be mailed or otherwise conveniently dispensed to participant members of the public, and arrangement may be made for the said user of the card to pay the sponsor only for programs actually viewed. One plan is that payment may be made in the nature of a deposit for the complete use of the card, and the patron may be later credited for any programs not viewed. Another plan is that a card will be provided and at a later time payment will be made for the programs viewed and not for others (in case the card is for more than one program as described in the above mentioned copending application Serial No. 418,642).

It is a further object of the invention to provide business or record cards for use as aforesaid, wherein printed circuits are included on the card which must be broken by punching or other means of intended destruction of a portion of the card, so that an otherwise existing short circuit or other circuit which would render the receiving equipment inoperative, is opened.

A further object of the invention is to provide in combination with the structure as recited in the foregoing object, an arrangement whereby other circuits printed on the card must be maintained, which circuits might be unintentionally opened by incorrect punching or destruction of a portion of the card.

A still further object of the invention is to provide a method comprising the use of an individualized card in combination with a standard decoding card, for preventing illicit reception.

Further objects and the entire scope of the invention will be in part expressed and in part obvious from the following detailed description of illustrative embodiments of the invention and from the appended claims.

The illustrative embodiments of the invention to be described may be best understood with reference to the accompanying drawings, wherein.

Figure 6:
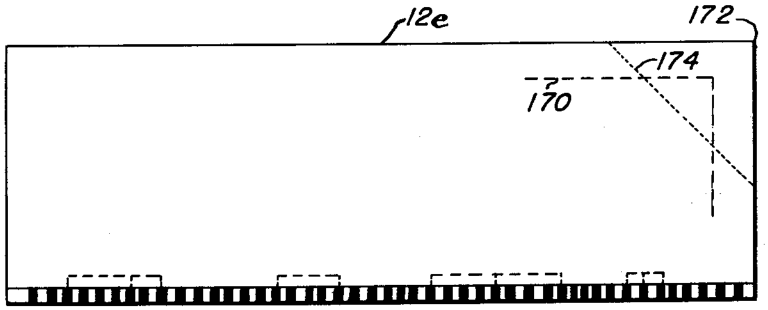
FIGURE 6 shows yet another embodiment of a decoding card according to the present invention.
Figure 12:
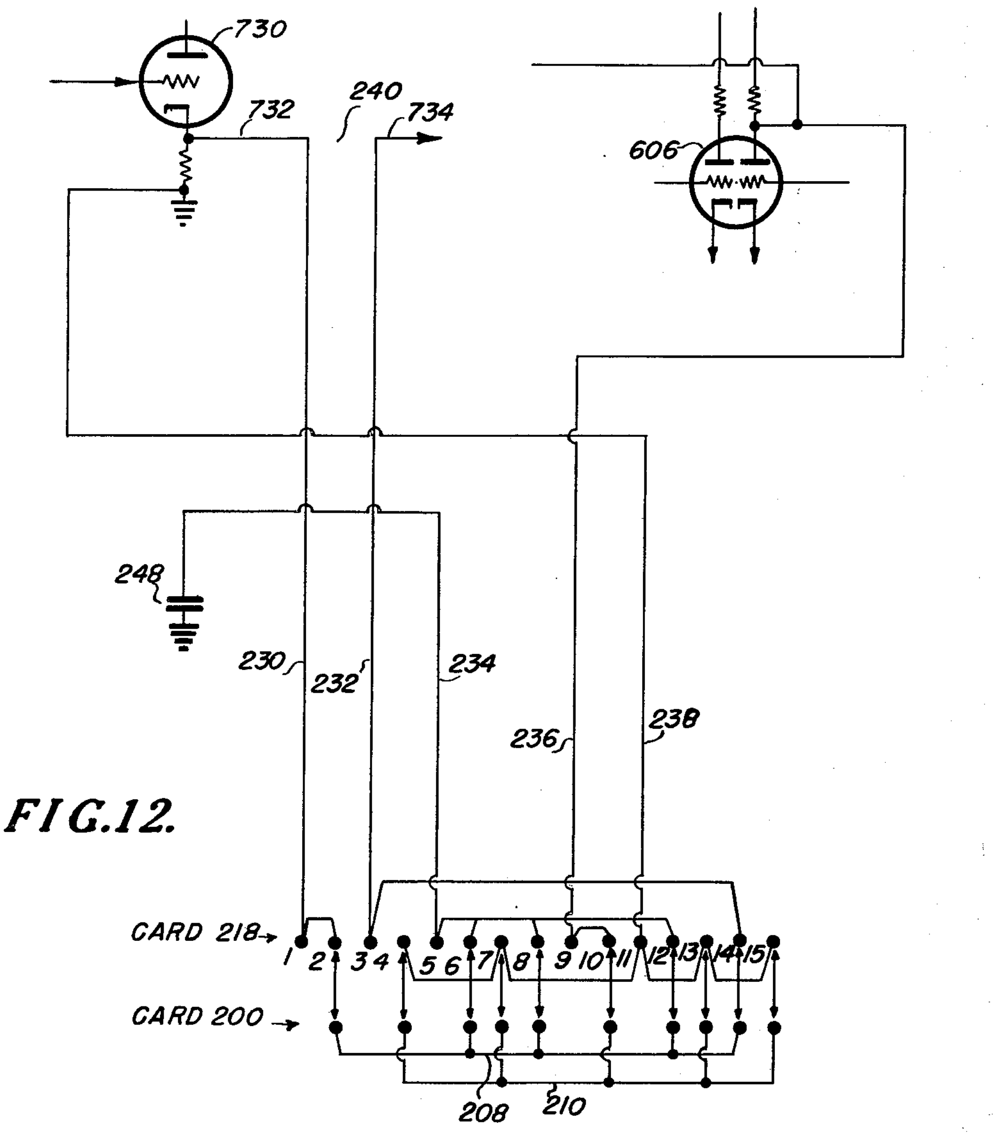
Figure 8:
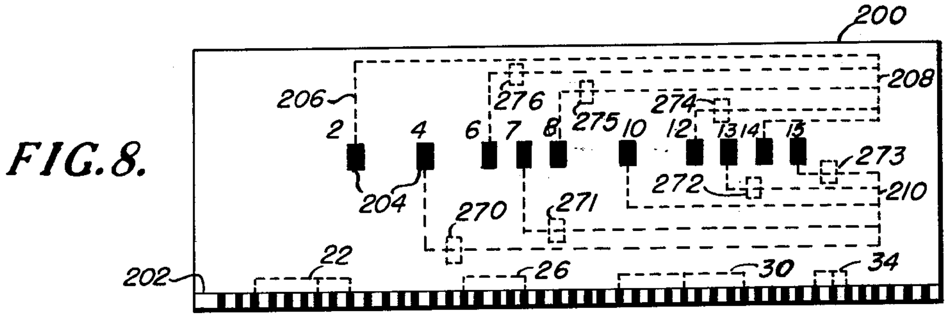
FIGURE 8 shows a standard decoding card to be employed in combination with an individualized card, according to methods and structure which are part of the present invention.
Figure 11:
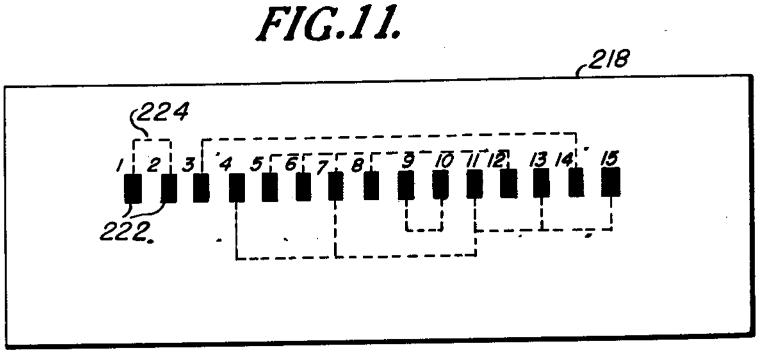

FIGURE 11 shows an individualized decoder card according to the present invention to be used in combination with a standard card as shown in FIGURE 8, and FIGURE 12 shows portions of FIGURE 6 of said copending application Serial No. 418,642 and further shows diagrammatically connections made between the cards of FIGURES 8 and 11 of the present application, to explain the operation of a phase of the present invention.

Figure 1:
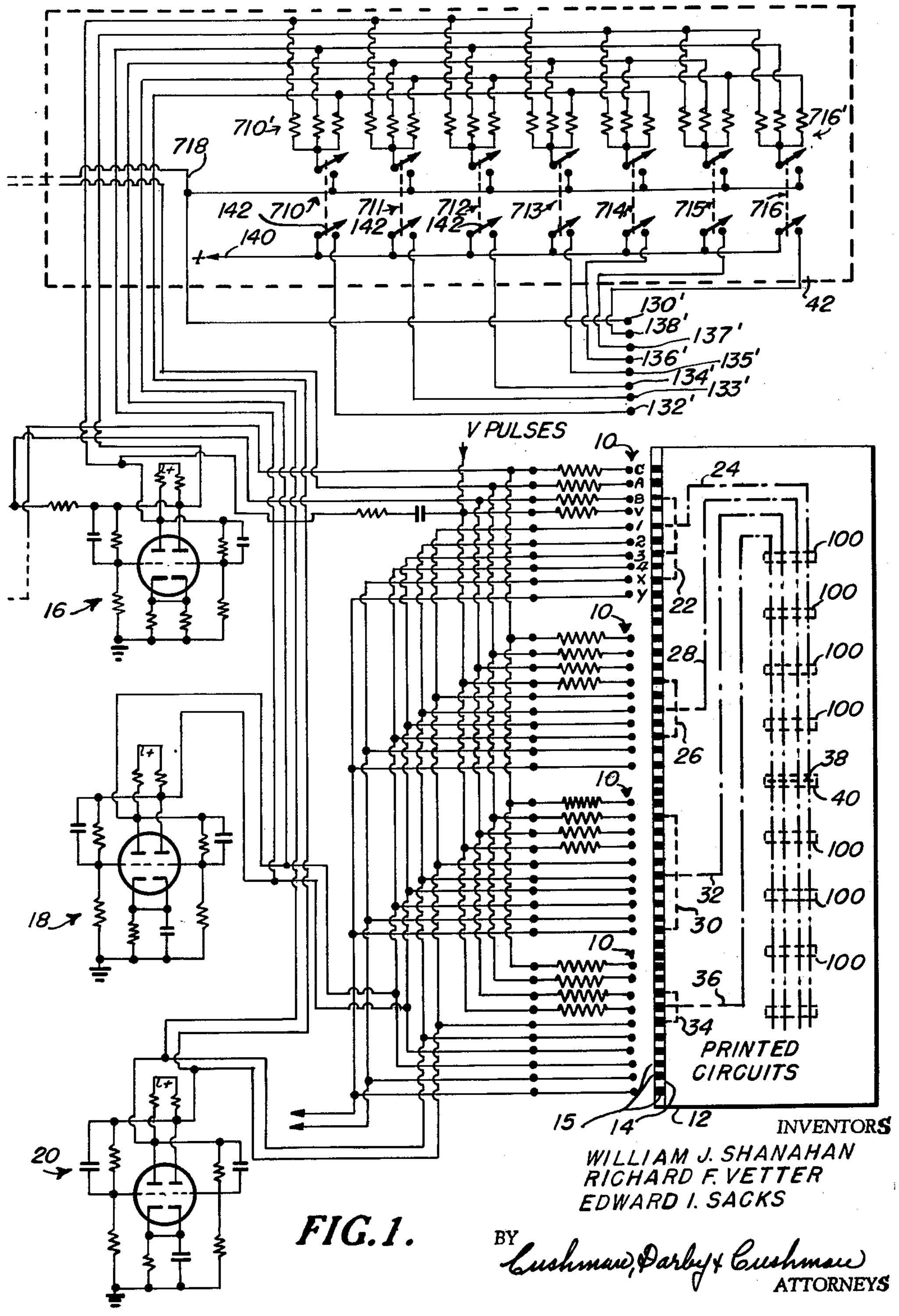
FIGURE 1 is a partial showing of complete circuitry from above mentioned copending application Serial No. 418,642 and further shows additional matter illustrating certain embodiments of the present invention.

The setting of the invention and some embodiments thereof may be best understood by initial reference to FIGURE 1 of the accompanying drawings. FIGURE 1 is largely a reproduction of FIGURE 5B of the above mentioned copending application Serial No. 418,642. Briefly stated, application Serial No. 418,642 describes receiving equipment which includes decoding equipment, the latter being characterized by sets of terminals 10 so arranged in suitable structure (not shown in FIG. 1) that a record or business card 12 may be moved into engagement therewith. As is fully described in both of the hereinabove mentioned copending applications the card 12 in at least one embodiment is described as a record or business card carrying printed circuits thereon, as designated by legend in FIGURE 1 of the present application. The portion of the card to the left of demarkation line 14 as viewed in FIGURE 1 may be visible, so as to provide accessible areas 15 of conductive material which may be brought into electrical contact with the terminals 10. An understanding of representative structure for thus contacting the visible part of the card may be completely understood by reference to FIGURES 10 and 11 of copending application Serial No. 418,642 and the pertinent portions of the specification thereof. No further explanation is thought to be necessary in this application. The area of the record card 12 as designated in the present application to the right of the line 14 in FIGURE 1, will not permit viewing the remainder of the printed circuits. However, these circuits are shown as dotted in FIGURE 1 and related figures of this application for permitting an understanding of the present invention. It is notable that the technique of constructing the cards 12 can, in fact, be such that any attempt to peel off layers of the card or otherwise disassemble same to attempt to learn the circuit cannot be successful.

At this point of the present specification, and assuming an understanding of the equipment described in the above mentioned copending applications, it will be appreciated that when the card 12 of FIGURE 1 of this application is inserted into suitable structure so as to electrically engage the exposed portions of the printed circuits of the card with the terminals 10, certain pulse circuits and other circuits for carrying potentials maintained by flip-flop circuits 16, 18 and 20 will be completed according to a pre-arranged code or plan, so that the scrambled image as transmitted from the transmitting station will be unscrambled and can be viewed on the display means of the receiving equipment otherwise connected to the circuits shown in FIGURE 1. As is fully explained in the above mentioned copending applications, switching means at the transmitting station may be changed from hour to hour, day to day, week to week, or otherwise as desired, whereupon a card 12 with a different arrangement of printed circuits must be employed, to contact the terminals in the sets of terminals 10, to properly unscramble the image.

One embodiment of the present invention may be understood by continued reference to FIGURE 1 wherein the card 12 is shown with certain printed circuits and other matter in addition to the circuits shown in FIGURE 5B. The uppermost printed circuit shown in FIGURE 5B of application Serial No. 418,642 is now designated by reference character 22 and extending therefrom is a further printed circuit line 24 which extends generally toward the top of the card and then downwardly parallel to the right-hand edge thereof. The second printed circuit as shown in FIGURE 5B of application Serial No. 418,642 is now designated by reference to character 26 and extending therefrom in FIGURE 1 is a printed circuit line 28 which extends toward the top of the card 12 and then downwardly parallel to the previously mentioned printed circuit line 24. The next lower printed circuit section from application Serial No. 418,642 is now designated by reference character 30 and extending therefrom is now shown further printed circuit line 32 which extends parallel to the previously mentioned lines. Finally, the lowermost printed circuit line from application Serial No. 418,642 is designated now by reference character 34 and extending therefrom is shown further printed circuit line 36, again extending parallel to the previously mentioned circuit lines downwardly parallel to the vertically arranged edges of the card as shown in FIGURE 1. At a predetermined point along the parallel extensions of the lines 24, 28, 32 and 36 there is a printed circuit shorting bar 38 which electrically interconnects all of the lines 24, 28, 32 and 36.

At this point it will be apparent that if a card such as shown in FIGURE 1 is inserted into engagement with the terminals 10 in a complete circuit as described in application Serial No. 418,642, or in the circuits having similar function explained in copending application Serial No. 316,485, the short-circuiting of the otherwise existing printed circuit sections 22, 26, 30 and 34 will result in malfunction or inoperability of the decoding circuits. However, this inoperability can be remedied if the shorting bar 38 is removed.

Figure 10:
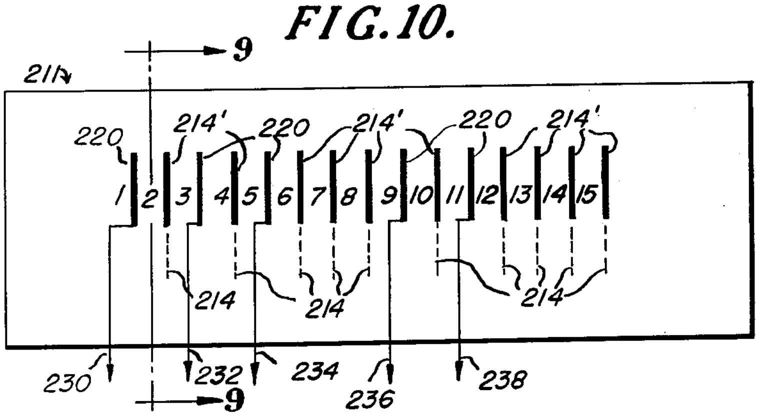
FIGURE 10 shows a front view of the structure of FIGURE 9.

For removal of the shorting bar 38 it is proposed that suitable punching apparatus (not shown) constructed, for example, along the lines of the punching equipment shown in FIGURES 10 and 11 of application Serial No. 418,642, can be designed so that the punched-out portion of the card will be the area described by chain line 40. Actually, it is immaterial whether the punching occurs after the card has been inserted into the receptacle which causes engagement with the terminals 10, or whether the card is punctured before use so as to destroy the shorting bar 38. The point is that by the present invention use and enjoyment of the card entails the destruction thereof within the area defined by chain line 40 and payment will be required when the card as mutilated is presented for reduction in payment or for refund.

Thus far in the description it has been assumed that one and only one printed circuit card is intended to serve to unscramble the televised image for a given period of time, and no regard is had for the additional circuitry within chain line 42 in FIGURE 1, which is described in application Serial No. 418,642, FIGURE 5B thereof, as permitting a single card to be employed for decoding under different conditions for sequential periods of time. It may further be mentioned at this point that in connection with card 12 in FIGURE 1 there are shown additional dash lines which define additional areas similar to the area 40. These will be alluded to hereinbelow.

Figure 2:
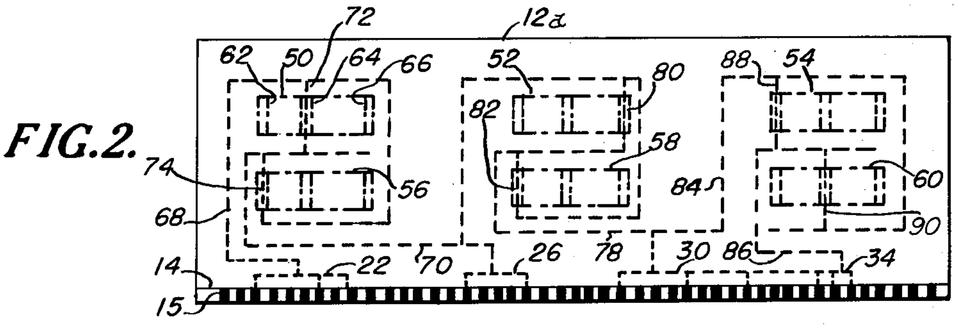
FIGURE 2 shows a second embodiment of decoding card according to the present invention.

The next embodiment of the invention to be described is based primarily on the concept of adding to the problem of attempting to use cards illicitly by providing to the users of unscrambling equipment, several classes or variations of decoding units having differing punch or other mutilating structure, and having available a like number of different classes of decoding cards. By this method, with attention paid to providing users in the same neighborhood or grouping with different classes of equipment, it will prevent possibility of unauthorized exchange of cards. This aspect of the invention will be described with regard to several embodiments of specific card structure, the first of which is shown in FIGURE 2, where the card is designated as 12*a*. In this case the same basic decoding printed circuit sections 22, 26, 30 and 34 are illustrated. However, a plural punching operation is contemplated and the equipment (not shown) will be provided for creating a first punch-out within an area defined by dash line 50, a second punch-out within an area defined by dash line 52, another within dash line 54, another within dash line 56, another within dash line 58 and another within dash line 60. Returning to the area within dash line 50, as an example, a punch may be positioned to punch-out the area within dash line 62 or within dash line 64, or within dash line 66. Any one decoding unit will have the punches thereof so arranged that one and only one of these areas will be punched-out, one in the area defined by dash line 50, one in the area defined by dash line 52, etc. There are three possible positions within each area, and there are six areas, thereby providing a great number of combinations or classes.

Having a given code plan in mind for a given class of punch structure and card structure, a printed circuit 68 may extend from printed circuit 22 and a second printed circuit 70 may extend from printed circuit 26 so that a first printed circuit cross bar 72 and a second printed circuit cross bar 74 form two paths in parallel short-circuiting the lines 68 and 70. Similarly, printed circuit line 76 from printed circuit section 26 and printed circuit line 78 from printed circuit section 30 may be shorted by two bars 80 and 82 in parallel, crossing one of the potential punch-out areas in areas defined by dash line 52 and 58, respectively. Additionally, printed circuit line 84 connected with printed circuit section 30 and printed circuit line 86 connected with printed circuit section 34 may be shorted by printed circuit bars 88 and 90 in parallel, which cross pre-selected ones of the prospective punch-out areas within the areas defined by dash lines 54 and 60, respectively. A condition analogous to the shorting bar 38 of the card 12 as shown in FIGURE 1 will now be observed, to the extent that if an incorrect punch structure is used for a given card, or vice versa, at least one of the shorting bars may continue to exist. Therefore, at least a part of the operation of the decoder will be inhibited. It will be understood that there are a great number of possible arrangements of printed circuit sections such as sections 22, 26, 30 and 34 for use, and it may be that short circuit could be made across two of such blocks without inhibiting the operation of the decoder. However, it is expected that the entire situation will be evaluated upon the design of every class of card and therefore the desired function may be obtained.

In FIGURE 2, as in FIGURE 1, it is contemplated that the card will be for a single use—that is for a single setting of the switching matrix at the transmitter. Therefore, it is contemplated that a single punching is all that is expected of the user, with one punched-out area in case of card 12 of FIGURE 1 and with a plurality of punched-out areas in the case of card 12*a* of FIGURE 2. In other words, again in regard to FIGURE 2, the day of the week circuits within chain line 42 in FIGURE 1 are not in use.

The cards 12 and 12*a* have the shorting circuits combined with the exemplary decoding circuits 22, 26, 30 and 34. This is of particular interest, inasmuch as the contact of the terminals 10 with the circuits 22, 26, 30 and 34 must be employed for successful operation of the decoder.

It will now also be apparent that by establishing a great number of classes of punching structures, to conform to the classes of cards, it will be unlikely that one person will be able to come into unauthorized possession of a card. It will be understood that placing a card 12*a* of one class in a punching apparatus of a different class, will unavoidably result in one or more of the shorting bars remaining in existence with the resulting inhibition of the correct operation of the receiving and decoding circuits.

Reference may again be made to card 12 in FIGURE 1 and to the remaining dash lines similar to dash line 40. These remaining dash lines, designated by reference character 100, may be alternative locations of the shorting bar 38, so as to permit practice of the classification of punching equipment and cards as described in the immediately preceding paragraphs in regard to card 12*a* of FIGURE 2. However, obviously the number of classes is not as great as in the arrangement shown in FIGURE 2.

Figure 3:
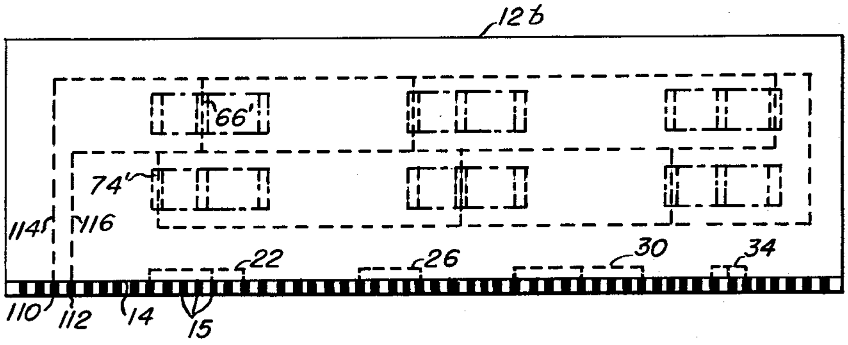
FIGURE 3 shows still another embodiment of a decoding card according to the present invention.

Now referring to FIGURE 3, a card 12*b* is shown for the same use as the cards of FIGURES 1 and 2. The main decoding printed circuit sections 22, 26, 30 and 34 are shown, but these are not interconnected with shorting circuits. On the contrary, it is here contemplated that a circuit may be additionally brought from the decoding structure into the card via contact areas 110 and 112. Further printed circuit lines 114 and 116 may extend from areas 110 and 112 respectively and shorting bars 66′, 74′, etc. (corresponding to the shorting bars 66 and 74 of FIG. 2) may exist, and punch-out by a punching apparatus of the same class as the card 12*b*. The circuit in the decoding equipment (not shown) for connection to areas 110 and 112 may extend to any connection in the circuit so as to suppress operation of the decoding of the receiver equipment. For example, it could short-circuit a grid bias at some strategic point. Further explanation is though to be unnecessary.

Figure 4:
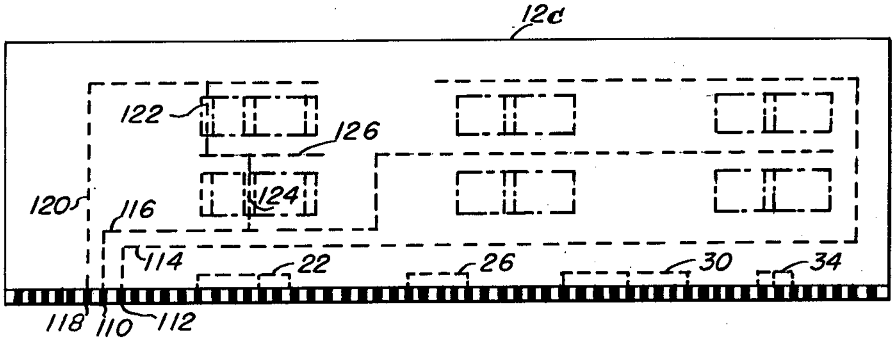
FIGURE 4 shows still another embodiment of a decoding card according to the present invention.

The card in FIGURE 4 is designated 12*c* and it may be understood that it is the same as the card 12*b* of FIGURE 3 with the exception that an additional contact area 118 may be provided and a printed circuit line 120 extend therefrom. A circuit can be established beween line 120 and line 116 and one or two or more of the punch-out areas may carry shorting bars here designated 122 and 124. These may be connected in series between lines 116 and 120 by any convenient printed circuit line such as the bus line 126. In the use of card 12*c* for proper operation of the decoder, the circuit between lines 116 and 120 must be complete (any circuit within the decoding equipment or receiver could be passed between terminals 110 and 118, such as the supply of bias or plate potential to a given tube or tubes).

If the card 12*c* is placed in punching apparatus of the improper class, there is the possibility that one of the shorting bars 122 or 124 may be punched-out, thus preventing correct operation of the decoding equipment.

Figure 5:
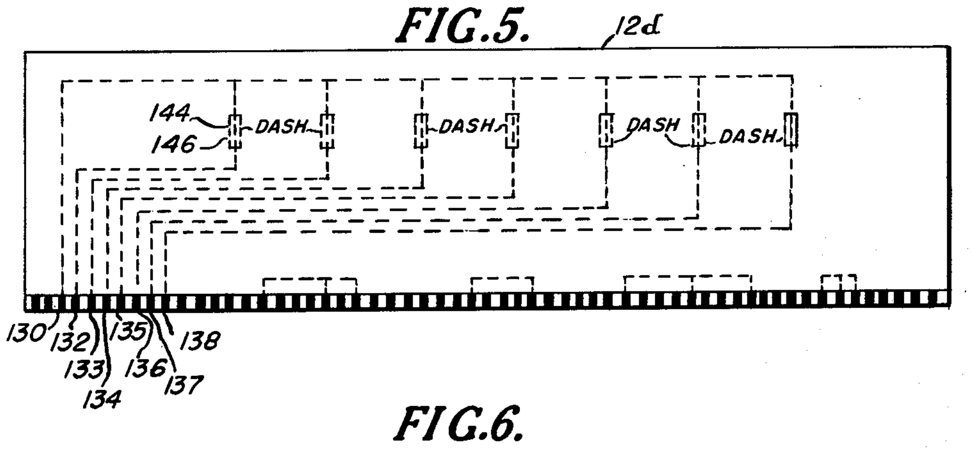
FIGURE 5 shows a still further embodiment of a decoding card according to the present invention.

Now referring to FIGURE 5 and card 12*d* illustrated therein, if the day of the week coding principle as described with regard to FIGURE 5B in copending application Serial No. 418,642 be employed, an additional contact area 130 may be provided for bringing onto the card a connection to the disruption circuit line 718 as explained in application Serial No. 418,642. A relatively high voltage on that line is explained in said application as causing disruption or suppression of the proper functioning of the receiving equipment. Referring to FIGURE 5B of Serial No. 418,642, for a given day of the week, say Sunday (assuming one day's program is on a given code) switch 710 may be closed. On this day the transmitter apparatus is so arranged that binary code situations will be avoided whereby on three lines feeding resistors 710′ there would be a relatively high potential. If an attempt is made to use the same card for subsequent days, closing of another one of the switches for the given day would fine a different one of the binary code situations being avoided, with the result that from time to time all three resistors would be connected to sources of the high potential whereupon no sufficient voltage divider operation would occur across the resistors like the set 710′ to place the disruption line 718 at other than the high potential. When the high potential is applied to line 718, the disruption circuit functions.

Referring again to FIGURE 5 of the present application, additional contact areas 132–138 inclusive may be employed to bring onto the card a high potential from a source (not shown) connected to line 140 in FIGURE 1 when circuits are completed to one of the terminals 132–138 upon the operation of an additional switch arm 142 operated conjointly with the switch arm of the switches 710–716 shown in FIGURE 5B of application Serial No. 418,642. Thus, it will be apparent that when for example the switch 710 for Sunday is closed, the newly added switch arm 142 will function to place the potential from line 140 onto the contact area 132 of card 12*d* of FIGURE 4 via an additional terminal 132′ which may be added to the terminals 10 in FIGURE 1. The potential on line 140 will be sufficient to operate the disruption circuitry and it will be apparent that unless the section of printed circuit 144 within punch-out area defined by dash line 146 is destroyed, the potential on line 140 will be completed through section 144 to thereby cause continuous operation of the disruption circuitry. Similar circuits may be completed by the addition of switch arms 142 to the switches 711–716, to be connected to terminals 133′–138′ for contacting areas 133–138 inclusive of the card 12*d* of FIGURE 5. The various punches for the other days of the week will be positioned to punch-out the areas defined by dash lines 148, 150, 152, 154, 156 and 158, respectively.

Referring now to FIGURE 6, another basic embodiment of the present invention is diagrammatically illustrated with reference to card 12*e* there illustrated. In this case it is contemplated that a printed circuit line 170 may pass adjacent one corner 172 of the card. The particular nature of the remainder of the circuit of which printed circuit line 170 is a part is not important, so long as it is understood that the card may be perforated or otherwise marked along dash line 174, so that this part of the card may be torn off prior to use. Removal of the corner of the card will result in opening the circuit and permitting proper operation of the decoding equipment.

Figure 7:
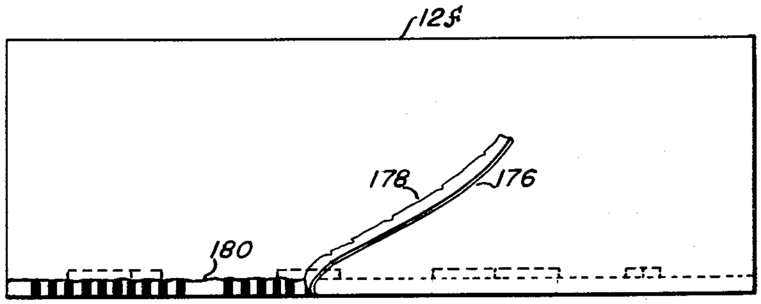
FIGURE 7 shows a further embodiment of a decoding card according to the present invention.

With reference to FIGURE 7, another embodiment of the invention is shown, this being a case wherein a card 12*f* may be so arranged that when received by the prospective user, the contact areas are covered by a strip of masking tape 176 or the like which must be removed.

The tape 176 will be affixed to the card 12f so that at least along one edge 178 an adhesive is employed. When the tape is pulled from the card a ragged or other identifiable area 180 appears on the card. Accordingly, even if some attempt is made to re-apply tape 176 to a card which has been used, there will be evidence of actual removal of the original tape 176. If evidence appears that the original mask has been removed, a charge will be made for use of the card.

Still another basic approach to the problem of preventing illicit use of cards is to place upon or absorb into the card one of the chemicals now known in the facsimile art which will cause discoloration when currents or voltages are applied between terminals of the card. Thus, use of a card will invariably result in telltale markings.

A still further embodiment of the invention will now be described with reference to FIGURES 8–12 inclusive. This embodiment of the invention comprehends that decoding cards which are identical and of one class may be issued to all users. However, to successfully use the said decoding card, individualized cards will also be issued to users, to be employed in combination with the said decoding card to provide the final operability of the decoding circuits. The individualized cards will essentially be cards which differ from one class of card to another and there may be a great number of classes. Also, the arrangement of punches in decoding equipment will vary from class to class. That is, there will be a number of different classes of punching equipment, conforming to the number of classes of individualized cards, notwithstanding that a standard decoding card will be punched in all cases. In FIGURE 8 a decoding card 200 is illustrated, this card being characterized by the usual type of decoding printed circuit sections which, for convenience, are again shown as the printed circuit sections 22, 26, 30 and 34. Again it will be understood that only the lowermost extremities of the terminals of sections 22, 26, 30 and 34 will be visible, along with all of the other terminals which may in fact not be employed. In other words, analogous to the part of the card to the right of chain line 14 in FIGURE 1 being obscured, all of the card 200 above line 202 will be obscured, with certain exceptions now to be mentioned. The card 200 is further characterized by areas of conductive material 204 aligned along the middle portion thereof as shown in FIGURE 8. To these exposed sections 204 various printed circuit lines, for example line 206, are connected, all terminating in bus sections 208 and 210. It is to be emphasized that these lines are obscured and only the contact areas 204 may be viewed.

Figure 9:
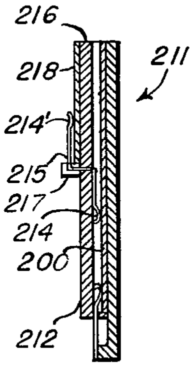
FIGURE 9 shows an end view of decoding and individualized card receiving structure for use according to the present invention.

FIGURE 9 shows an end view of structure 211 for receiving the decoding card 200, this structure being a modification of the structure shown in FIGURES 10 and 11 of application Serial No. 418,642, as will now be explained. A row of contacts 212 are provided along the bottom of a receiving slot for receiving card 200 so as to contact the terminals of the decoding circuits along the lower edge of the card, as is contemplated in said application Serial No. 418,642. However, additionally, contacts 214 are arranged along the structure 211 for receiving card 200 so as to be in a position to contact the exposed areas 204 when the decoding card 200 is in place. A typical arrangement of contacts 214 is shown in FIGURE 10, which shows a front view of the structure 211 otherwise shown in FIGURE 9.

The contacts 214 extend via jumper members 215 through the front panel 216 of the structure 211 and terminate at 214'. A horizontal bar 217 is provided for determining the degree of insertion of an individualized card 218 shown in FIGURE 11. Contacts 214' are so designated in FIGURE 10. In addition to contacts 214' which extend electrically from contacts 214, there are additional contacts 220 which do not extend to any point in contact with decoding card 200, but which are otherwise connected to the circuitry of the decoding apparatus, as will be explained hereinbelow. The individualized card 218 has exposed printed circuit contact areas 222 and interconnecting these areas are printed circuit lines exemplified by line 224, which interconnect certain ones of areas 222. It will be understood that all printed circuit lines such as 224 on card 218 are obscured.

It will now be understood that when card 200 and a proper card 218 are placed in the card receiving structure 211, contacts 214 and 214' and jumpers 215 serve to interconnect the decoding card 200 with the individualized card 218 so that the printed circuit lines such as lines 206, 208 and 210 on the decording card complete circuits between certain ones of the contact areas 22 on the individualized card 218. In the illustrative embodiments shown in FIGURES 8–11 inclusive, there are a total of fifteen areas 222 on the card 218 (numbered 1–15 in FIGURE 11) which come into alignment with the contacts 214' and the contacts 220 mounted on the card holding structure 211, these being in alignment when the card 218 is properly inserted into the card holding structure. Additionally, the contacts 214 find alignment with at least the intended ones of the contact areas 204 of the card 200 when the latter is properly inserted. Positions 1–15 also appear in FIGURES 8 and 10.

With reference to FIGURE 10, and considering the contacts 220 to be positioned as numbers 1, 3, 5, 9 and 11 reading the total number of card 218 terminals from left to right, number 1 may be connected to a conductor 230, number 3 may be connected to a conductor 232, number 5 connected to a conductor 234, number 9 connected to a conductor 236 and number 11 connected to a conductor 238. These conductors may be further connected to circuitry in the decoding equipment which may be either for completion of circuits necessary to the operation of the decoder, or to circuits which if left completed will prevent proper operation of the decoder. For example, and now with reference to FIGURE 12, which shows portions of FIGURE 6 of copending application Serial No. 418,642, the circuit shown in FIGURE 6 of said application for connecting line 732 thereof to line 734 thereof, may be opened as at 240 and line 230 connected to one side of the opening and line 232 connected to the other side of the opening. Thus, if the circuit of FIGURE 6 of said application Serial No. 418,642 is to operate satisfactorily, connection between lines 230 and 232 must be effected by means of the decoding card 200 and the individualized card 218 to be used therewith in the card receiving structure 211 of FIGURES 9 and 10 of the present application.

To disable the decoding equipment unless a circuit is opened on the decoding card 200, the line 234 (FIG. 10) may be connected to a bypass capacitor 248 which is otherwise connected to ground. Previously mentioned line 238 may also be connected to ground as shown in FIGURE 12. It may further be noted that the right-hand plate of tube 606 of FIGURE 6 of application Serial No. 418,642 is shown in FIGURE 12 of the present application to be connected to line 236.

Comparison of the printed circuits on the cards 200 and 218 as illustrated in FIGURES 8, 11 and 12, and the contact structure as shown in FIGURES 9 and 10, will show the following situations to exist: First, line 230 will connect through the card 218 and through the card 200 to the line 232 via jumper connectors 215 numbers 2 and 14 of the card holding structure 211. This circuit is necessary for proper operation of the decoding circuits. Second, line 236 will be connected through jumper number 10 of the card holder structure 211 to the bus section 210 and from this bus section will be connected to ground line 238 via jumpers 215 numbers 4, 7, 13 and 15 if the decoding card remains unpunched. Placing line 236 on ground will ground the right-hand plate of tube 206 and prevent proper operation of the decoding circuits. Line 234 will be connected through jumpers 215 numbers 6, 8 and 12 of the card holding structure 211 to the lines 230 and 232 and will thus place bypass condenser 248 across the cathode follower resistor of the video amplification tube 730 of FIGURE 6 of application Serial No. 418,642, accordingly interfering with the proper operation of the entire receiving apparatus due to improper operation of the tube 730 in the decoding unit.

The circuits just mentioned which can interfere with the proper operation of the decoding circuitry are opened if the card decoding card 200 is placed in equipment which properly punches the card at specified places to open the circuits involved. It will be apparent that if the card 200 is punched at the areas defined by dash lines 270, 271, 272, 273, 274, 275 and 276 in FIGURE 8. It will be apparent that another class of punching equipment, which would punch areas differing from those just enumerated with reference to card 200, would not serve to adequately open the proper circuit.

It will be appreciated that other classes of card holding structure may have different arrangements of jumpers 215, as well as different arrangements of jumpers 215, as well as different arrangements of punches, arranged nevertheless to operate on the same decoding card 200, but in combination with a different individualized card 218. Additionally, the difference in class may be characterized by different connections from the circuit of the decoder into the terminals of the type 220 in the card holding structure 211.

In regard to FIGURES 8–12, it will be understood that card 200 may be changed from time to time to alter circuits such as 22, 26, 30 and 34.

In all cases, the areas on the cards to be punched-out or otherwise destroyed, may or may not be visibly marked on the cards. Marking of all possible areas, without clue to proper ones, may be used where the user is called upon to punch prior to insertion of the card into the decoder.

The above detailed description of illustrative embodiments of the invention are exemplary only, and the true scope of the invention is to be determined from the appended claims.

What is claimed is:

1. In a scrambled television transmission system of the type requiring the use of replaceable and insertable means at the receiving end for completing decoding circuitry, a first decoding card and a second decoding card, the latter being individualized to a given television receiver at said receiving end, each card having printed circuits thereon, card receiving structure coupled to said receiver for receiving both said cards, electrically conductive means on said card holding structure for contacting at one end thereof exposed printed circuit areas on said first decoding card, and for contacting at the other end thereof exposed printed circuit areas of said individualized card, at least part of the printed circuits on the individualized card serving to complete to the decoding circuitry at least part of the printed circuits on the first decoding card for proper operation of said circuitry, at least one of the remaining printed circuits on at least one of the decoding cards being effective to inhibit proper operation of the decoding circuitry at the receiving end of the system, the inhibiting printed circuits requiring mutilation at pre-selected areas thereof in conformity with the particular class of individualized card selected from a number of classes thereof which is employed, so as to open the proper printed circuits on the associated decoding card to permit proper operation of the decoding circuitry at the receiving end of the system.

2. A method of unscrambling scrambled television images with a decoding circuit having a plurality of terminals and a standard record card having printed cirsuits therein and a class card which is a predetermined one of a number of classes of cards and which also has printed circuits therein, including the steps of placing said standard card in contact with a first set of said terminals, placing said class card in contact with a second set of terminals, and opening at least one of the printed circuits in the standard card by destroying at least one area of the standard card through which said one printed circuit passes, said one circuit being operative before opening thereof to inhibit proper operation of the decoding circuit otherwise having its terminals properly interconnected by completion of at least some of the circuits on one card by corresponding circuits on the other card, the particular area or areas to be destroyed on the standard card being selected in conformity with the class identity of the class card.

References Cited in the file of this patent

UNITED STATES PATENTS

| | | |
|---|---|---|
| 2,414,101 | Hogan et al. | Jan. 14, 1947 |
| 2,484,642 | Paris | Oct. 11, 1949 |
| 2,501,274 | Hamilton | Mar. 21, 1950 |
| 2,565,611 | Kovach | Aug. 28, 1951 |
| 2,713,822 | Newman | July 26, 1955 |
| 2,753,393 | Pawley et al. | July 3, 1956 |
| 2,758,256 | Eisler | Aug. 7, 1956 |
| 2,779,654 | Williamson | Jan. 29, 1957 |
| 2,817,824 | Albright | Dec. 24, 1957 |
| 2,832,013 | Pedersen | Apr. 22, 1958 |